United States Patent [19]

Weis et al.

[11] 3,730,348
[45] May 1, 1973

[54] FILTER SCREEN

[75] Inventors: Frank G. Weis, Kansas City, Mo.; Marvin E. Wood, Lenexa, Kans.

[73] Assignee: Ecodyne Corporation, Chicago, Ill.

[22] Filed: Apr. 19, 1971

[21] Appl. No.: 135,263

[52] U.S. Cl. ................. 210/274, 210/275, 210/289
[51] Int. Cl. ........................................... B01d 29/08
[58] Field of Search ................. 210/274, 291, 292, 210/293, 275, 289

[56] References Cited

UNITED STATES PATENTS

| | | | |
|---|---|---|---|
| 3,468,422 | 9/1969 | Camp | 210/274 |
| 1,692,592 | 11/1928 | Stickney | 210/292 |
| 2,572,097 | 10/1951 | Bakker | 210/292 |
| 3,245,540 | 4/1966 | Johnson | 210/291 |
| 3,498,462 | 3/1970 | Larrowe et al. | 210/293 X |
| 1,111,471 | 9/1914 | Krause | 210/292 |
| 3,472,382 | 10/1969 | Soriente et al. | 210/293 X |

FOREIGN PATENTS OR APPLICATIONS

| | | | |
|---|---|---|---|
| 924,799 | 5/1963 | Great Britain | 210/293 |
| 1,184,324 | 2/1959 | France | 210/293 |

*Primary Examiner*—Samih N. Zaharna
*Attorney*—Charles M. Kaplan and Joel E. Siegel

[57] ABSTRACT

A filter strainer assembly for use in filtering apparatus having retaining lug means integral with a central portion thereof for holding the strainer assembly securely to a filter bed supporting plate. The strainer assembly includes a vertical center section, passing through the plate, having a passageway through a side portion thereof positioned above the plate and retaining lug means positioned below the plate. A resilient washer, which is in compression when the lug means is in its strainer securing position, is provided to compensate for material elongation. A passageway in the central section below the plate is formed by the lug means to permit gas accumulated under the plate to pass through the strainer.

6 Claims, 5 Drawing Figures

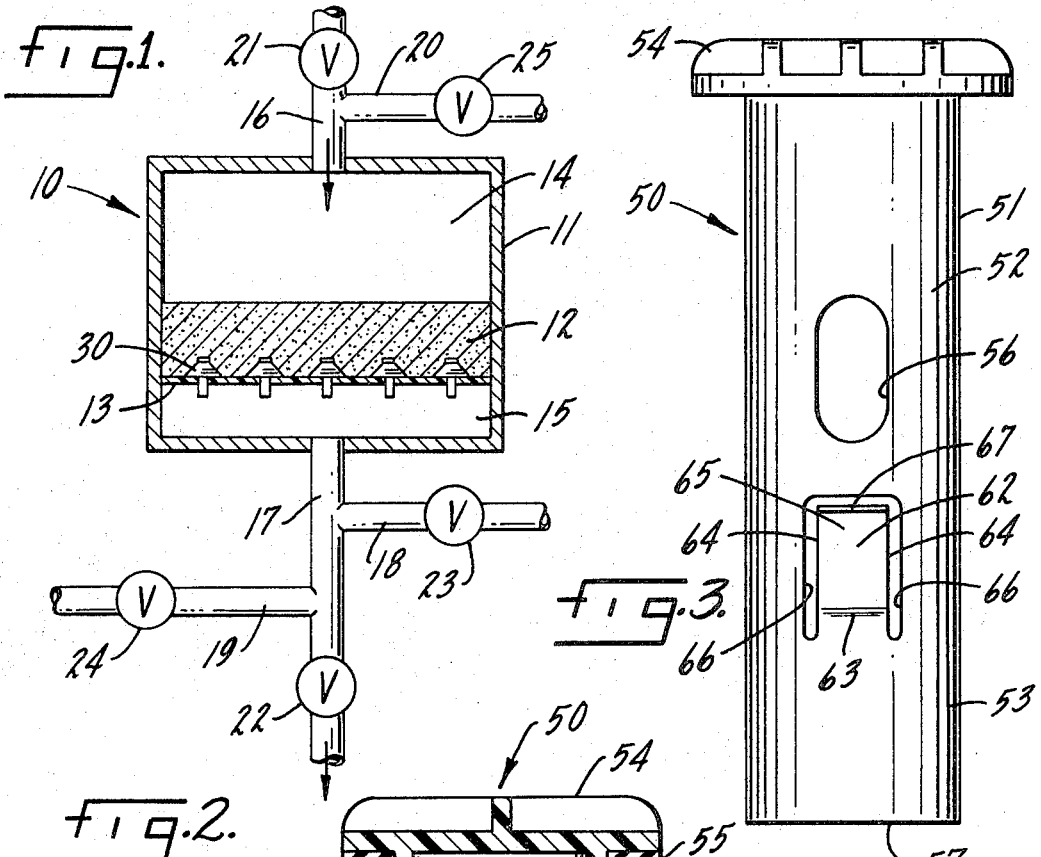
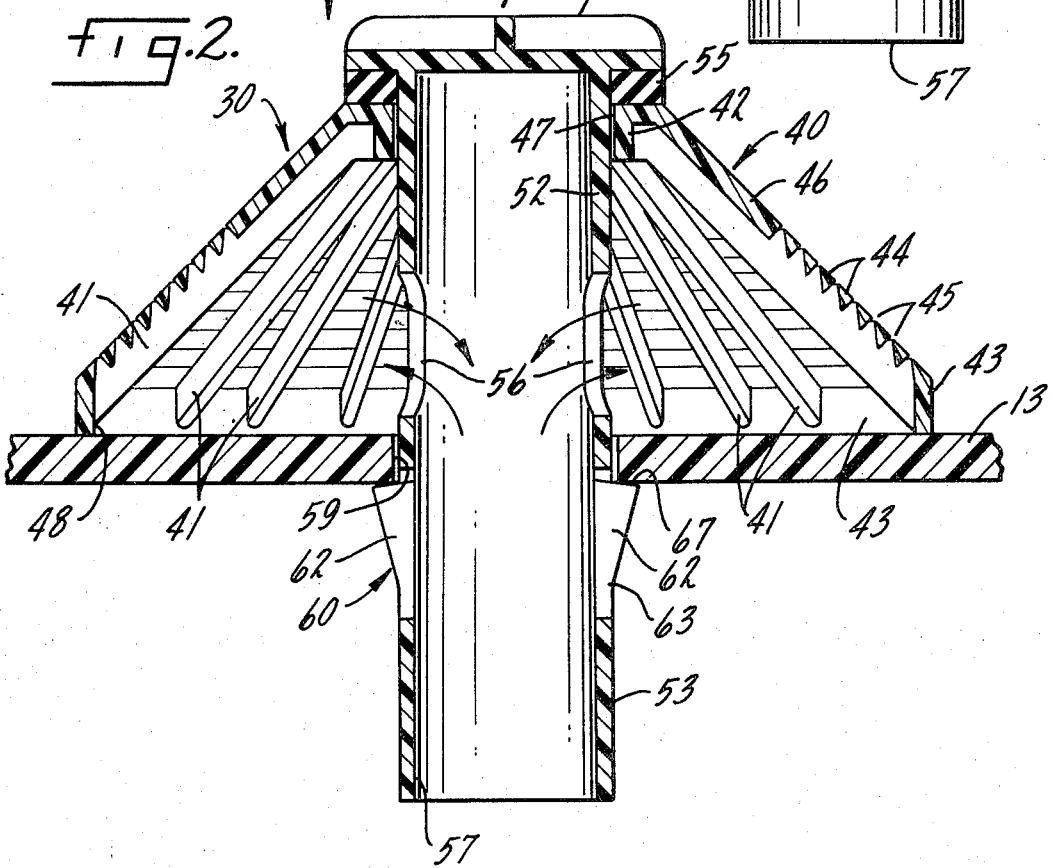

FILTER SCREEN

BACKGROUND OF THE INVENTION

This invention relates to underdrain strainers for filters, ion exchange beds and the like.

A typical method of filtering a liquid is to pass the liquid through a filter bed of suitable filter media, such as sand or other granular material well known in the art, which removes the suspended matter from the liquid. The filtered liquid passes through a plurality of underdrain strainers secured to a bottom plate, which retains the filter bed, to the underdrain compartment. The filtered liquid passes from the underdrain compartment to the service line through suitable conduits. After a period of time the filter bed becomes clogged and fouled with solid, foreign material, removed from the untreated liquid during filtration and, accordingly, becomes less efficient. As the filter bed becomes clogged, the pressure differential between the upstream side and the downstream side of the filter bed increases.

One method of cleaning the filter bed is to backwash the bed with filtered liquid. This step involves introducing a reverse flow of filtered liquid through the filter bed, via the strainers, to carry the foreign matter in the filter bed to waste. Some materials filtered from the raw liquid are sticky in nature and tend to adhere to the filter media and simple backwashing is not sufficiently effective to clean the bed after the filtering cycle. To overcome these deficiencies, a gas cleaning or scouring cycle is utilized before the backwashing cycle. In such a gas scouring cycle, air or other suitable gas under pressure is introduced into the underdrain compartment of the filter chamber and passed upwardly through the filter bed, via the strainers. As the air passes through the filter bed, it violently agitates the filter media and thereby dislodges foreign material in the filter bed and foreign material on the filter media. The backwash liquid then removes the foreign material from the filter chamber.

Heretofore, underdrain strainers have utilized mounting bolts to fasten the strainers to the bottom plate, which have tended to work loose due to the fact that the strainers are under compression while filtering but the compression is relieved when backwashing the filter media. The tension in the mounting may also be relieved by temperature elongation, creep and shipment vibration. Installation of such strainers have required the services of one man below the bottom plate and another man above the bottom plate. Further, prior art strainers do not provide means to ensure that air is delivered to all the strainers during the air scour cycle.

SUMMARY OF THE INVENTION

It is, therefore, an object of the present invention to provide a strainer for a filter and the like which is simple in construction and may be installed by one man without the use of special tools.

Another object is to provide a strainer for a filter and the like which will automatically maintain the correct mounting tension despite elongation of parts due to temperature or creep.

A further object is to provide a strainer for a filter and the like which eliminates the use of mounting bolts which have a tendency to work loose during the continual cycling changes and due to shipment vibration.

A still further object is to provide a strainer for a filter apparatus of the type providing a gas scouring cycle which ensures gas delivery to all strainers during the gas scouring cycle.

Another object is to provide a strainer for a filter and the like which will, during the backwash of the filter bed, afford cleaning of the area immediately between the strainers.

Briefly, the invention comprises a strainer composed of two parts, a hollow frustro-conical strainer member having a plurality of apertures or ports in its conical sidewall, and a vertical tubular center section passing through a central aperture in the top of the strainer member. The center section includes a head portion closing off the top portion thereof and positioned immediately above the central strainer aperture. A resilient washer is positioned between the head portion and the top of the strainer member. A plurality of retaining lugs, integral with the center section, are provided to contact the bottom surface of the plate supporting the filter media and thereby tension the strainer member between the head portion and the plate. A passageway is provided in the central section below the filter media supporting plate to permit gas from below the plate to pass therethrough and then upward through the center section into the strainer member through a passageway in the central section above the plate. The apertures in the strainer sidewall extend only through approximately the lower half thereof so as to create a swirling effect in the filter media during the backwash cycle.

The invention, both as to its organization and method of operation, taken with further objects and advantages thereof, will be understood by reference to the following description taken in conjunction with the accompanying drawings, in which:

DESCRIPTION OF THE DRAWINGS

FIG. 1 is a side elevational view, partially in section, illustrating a filter having a strainers embodying the feaures of the present invention;

FIG. 2 is a vertical sectional view illustrating an underdrain strainer embodying features of the present invention;

FIG. 3 is a side elevational view of the strainer center section;

DESCRIPTION OF A PREFERRED EMBODIMENT

Figure 4:
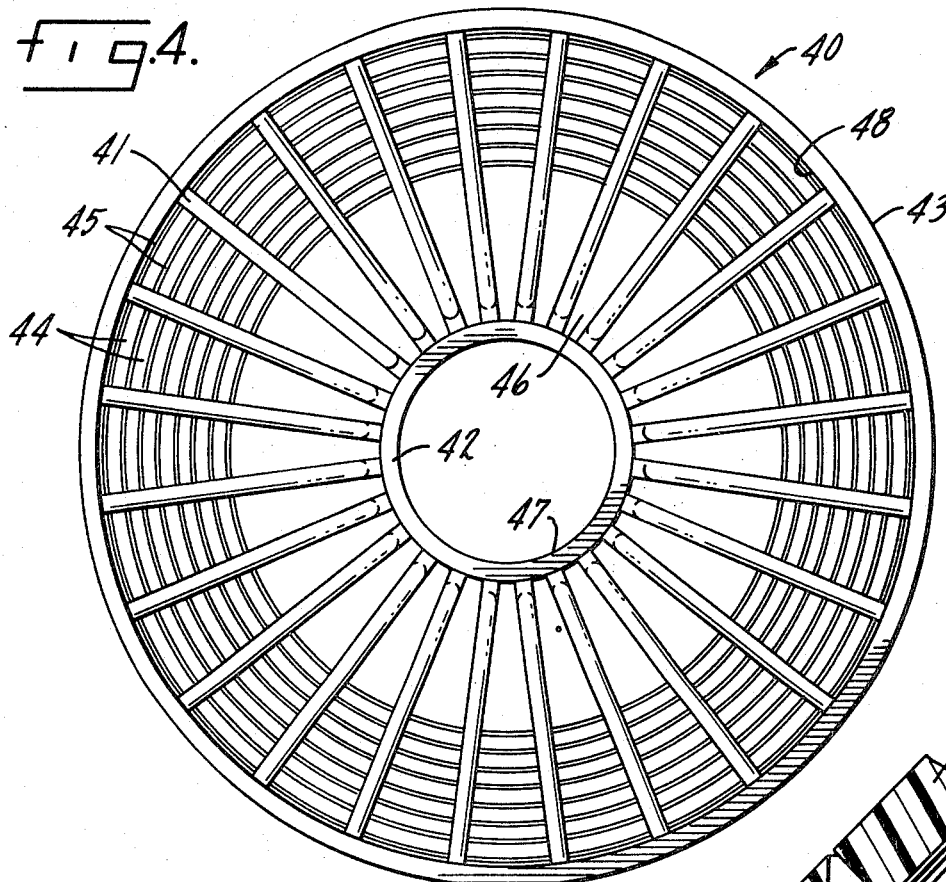
FIG. 4 is a bottom view of the strainer member.

Referring now to the drawings, and more particularly to FIG. 1, there is illustrated a simplified exemplary filter 10 utilizing the strainers of the present invention. Filter 10 has a filter bed 12 through which the raw liquid is passed during the service cycle to remove solid foreign materials therefrom. Filtered water from filter 10 is passed to service. After filter bed 12 has become clogged with foreign particles removed from the raw liquid, a gas scouring cycle is initiated wherein pressurized gas is passed upwardly threrthrough to dislodge foreign matter in bed 12. After filter bed 12 has been gas scoured, it is backwashed with treated liquid to remove the foreign material therefrom.

More specifically, filter 10 comprises a cylindrical tank 11 having a false bottom plate 13 dividing tank 11 into an inlet chamber 14 and an underdrain outlet chamber 15. Filter bed 12 of suitable filter media, such as sand or the like, is situated in filter chamber 14 on bottom plate 13. An inlet pipe 16 extends into and communicates with inlet chamber 14 to carry raw liquid into chamber 14. Outlet pipe 17 communicates with underdrain chamber 15 to pass the treated water from chamber 15 to service. A gas scour inlet pipe 18, has one end in fluid communication with outlet pipe 17 and the other end in fluid communication with a source of pressurized gas (not shown). Backwash inlet pipe 19 has one end in fluid communication with outlet pipe 17 and the other end in fluid communication with a backwash storage tank (not shown). A transfer pipe 20 communicates with inlet pipe 16 to carry backwash water from chamber 14. Conventional control valves 21, 22, 23, 24, and 25 are associated respectively with pipes 16, 17, 18, 19, and 20 to control fluid flow therethrough.

Figure 5:
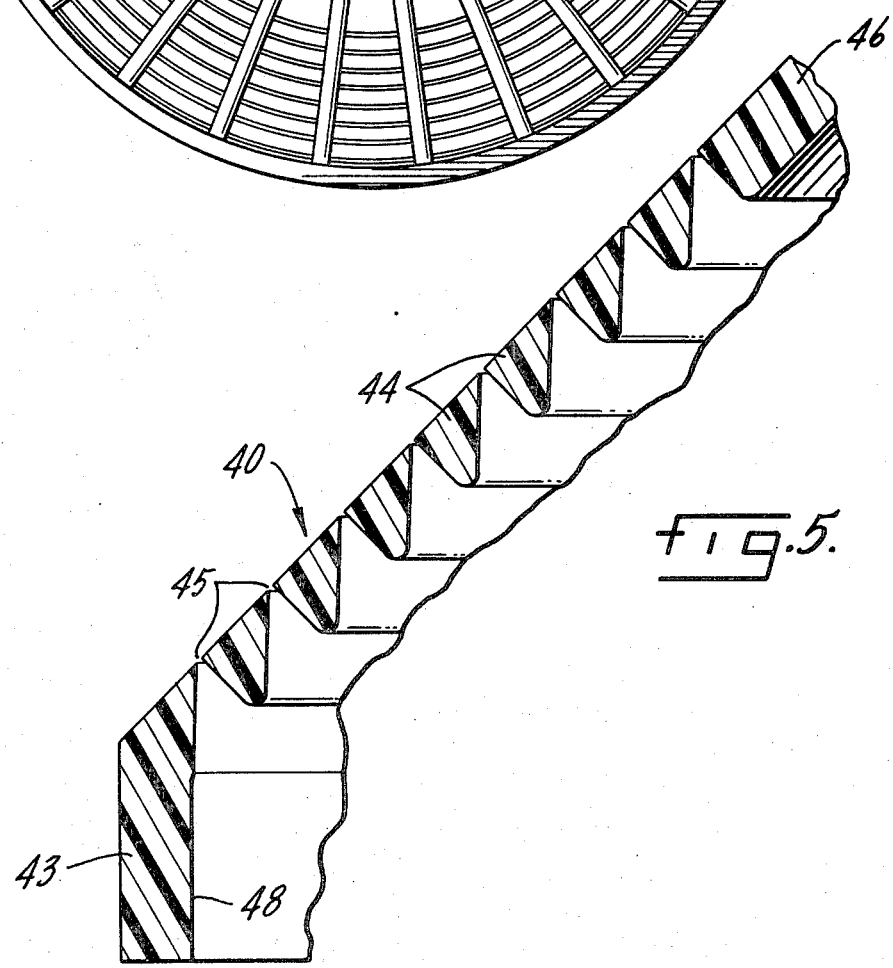
FIG. 5 is an enlarged vertical sectional view of a portion of the strainer member illustrating the slots passing through the sidewall.

Underdrain strainers 30, embodying the features of the present invention, are secured to bottom plate 13. Referring to FIGS. 2–5, strainer 30 includes a strainer member 40, a center section 50 and fastening means 60. As best seen in FIG. 2, strainer member 40 comprises a hollow member of generally frusto-conical shape formed by a plurality of vertical ribs 41 extending between an upper support ring 42 and a lower support ring 43. A plurality of closely spaced arcuate horizontal ribs 44, having a wedge-shaped vertical cross section, are formed between adjacent vertical ribs 41 to form a plurality of small apertures or slots 45, which prevent the filter media or the like from passing through strainer member 40 to underdrain chamber 15 during the service cycle. Ribs 44 only extend between the lower halves of ribs 41, above which are formed filler members 46 which prevent the flow of fluid through the upper portion of strainer member 40. Member 40 has an opening 47 through ring 42 and an opening 48 through ring 43. Strainer member 40 is preferably injection molded of a plastic material, i.e., nylon.

Center section 50, as seen in FIGS. 2 and 3, includes a tubular member 51, which passes through an opening 59 in bottom plate 13, having an upper section 52 positioned within member 40 above plate 13 and a lower section 53 positioned within chamber 15 below plate 13. Upper section 52 extends through aperture 47 in member 40 and has a head portion 54 closing off the top portion thereof. A tension compensating washer 55 is sandwiched between head portion 54 and ring 42. Apertures 56 in section 52 permit fluid communication between the interior of member 40 and the interior of section 52. Section 53 has an open bottom end 57.

Fastening means 60, as seen in FIGS. 2 and 3, includes a pair of retaining lugs 62, formed integral with an upper portion of section 53 to contact the lower surface of plate 13 and wedge member 40 between the upper surface of plate 13 and washer 55 and head portion 54. Lugs 62 have bottom portions 63 integral with section 53, and side portions and upper portions 64 and 65 respectively spaced a short distance from the surface of section 53, so as to permit a small amount of inward movement of lugs 62 and thus allow them to be forced through openings 47 and 59. As seen in FIG. 3 the spacing between side portion 64 and the surface of section 63 results in a pair of gas metering slots 66. Side portions 64 are inclined upwardly and outwardly such that as center section 50 is forced downward through openings 47 and 59, lugs 62 are forced inward as they pass through the openings and snap outward after they have passed therethrough into a locking position. The diametrical distance between the upper portions 65 of lugs 62 is greater than the diameter of opening 59. Upper portions 65 include top surfaces 67 which are slightly inclined downwardly and outwardly to fascilitate engagement with the bottom surface of plate 13. Lugs 62 are vertically positioned on section 53 such that when top surfaces 67 lock in contact with the bottom surface of plate 13, washer 55 is compressed between head 54 and member 40.

Bottom plate 13 has a plurality of openings 59 symmetrically spaced therethrough, each of which has a strainer 30 associated therewith. Strainers 30, embodying features of the present invention, may be installed by one man in a simple three step operation. First, washer 55 is positioned about upper section 52 adjacent head portion 54 by forcing it upward past lugs 62. Second, center section 50 is attached to strainer member 40 by passing section 50 downward through opening 47. As side portions 64 of lugs 62 contact the periphery of opening 47 the upper portions 65 of lugs 62 move inward permitting lug 62 to pass entirely therethrough. After lugs 62 have passed through opening 47, and therefore side portions 64 are no longer in contact with the periphery of opening 47 lugs 62 snap back to their original position which prevents the separation of section 50 from strainer member 40. Third, the lower section 53 is passed through opening 59 to attach strainer 30 in place on bottom plate 13. As side portions 64 of lugs 62 contact the periphery of opening 59 the upper portions 65 of lugs 62 move inwardly permitting lug 62 to pass entirely therethrough. As the top surfaces 67 of upper portions 65 clear the bottom of plate 13, lugs 62 snap back into their original or locked position wherein the surfaces 67 contact the bottom of plate 13. Surfaces 67 are vertically positioned on section 53 such that in order for surfaces 64 to clear the bottom of plate 13 a small compressing force must be applied to washer 55 by sandwiching washer 55 between head portion 54 and ring 42. Thus, strainer member 30 is securely fastened to plate 13 and since washer 55 is in compression a small degree of material elongation may be compensated for without effecting the securement of strainer 30 to plate 13. Further, vibration resulting from shipment of filter 10 will likewise not effect the attachment of strainer 30.

In operation of filter 10, during the filtering or service cycle valves 21 and 22 are open and valves 23, 24, and 25 are closed. Raw liquid passes through inlet pipe 16 into inlet chamber 14 and then passes through filter bed 12. The filtered liquid then passes through strainers 30 to underdrain chamber 15 and out through outlet pipe 17 to service. The filtered liquid passes through slots 45 into member 40 and then through apertures 56 into center section 50 before entering underdrain chamber 15. After filter bed 12 has become clogged with foreign particles removed from the raw liquid, a gas scouring cycle is initiated. During the gas scouring cycle valves 23 and 25 are open and valves 21, 22 and 24 are closed. pressurized gas (i.e., air) is bubbled through pipes 18 and 17 into underdrain chamber 15. As the air in chamber 15 rises, a portion of it enters bottom opening 57 in section 53, and the remainder continues to rise and passes through metering slots 65 into section 53. The air then passes through apertures 56 into member 40 and out through slots 45 into inlet chamber 14. As the air passes up through filter bed 12, the air agitates bed 12 and causes the foreign particles which have collected therein to become disengaged from the filter media. The scouring air passes out of inlet chamber 14 through transfer pipe 20. Metering slots 62 insure an even distribution of air through all the strainers 30 and prevent the accumulation of air in the upper portion of underdrain chamber 15. Upon completion of the gas scouring cycle the backwash cycle begins. During the backwash cycle valves 24 and 25 are open and valves 21, 22 and 23 are closed. Filtered liquid from a storage chamber (not shown) pass through pipes 19 and 17 into underdrain chamber 15, up through center section 50 into member 40, out slots 45 and through filter bed 12, and then out through transfer pipe 20 to drain. This flow of backwash liquid through filter bed 12 removes the foreign material which accumulated therein during the service cycle.

The filtering apparatus 10, as disclosed above is for exemplary purposes and should not be construed to indicate that the strainers 30 disclosed therewith do not have utility in conjunction with other types of filtering apparatus. While the embodiments discribed herein are at present considered to be preferred, it will be understood that various modifications and improvements may be made therein and it is intended to cover in the appended claims all such modifications and improvements as fall within the true spirit and scope of the invention.

What is claimed:

1. In an apparatus including a filter bed and a bottom plate supporting said bed, said bottom plate having at least one opening; the improvement being a strainer assembly comprising:
   a. a hollow conically shaped strainer member resting on said bottom plate, said strainer member having a plurality of apertures passing through the sidewall thereof, said strainer member having a central opening through an upper surface thereof in alignment with the opening in said bottom plate;
   b. a substantially vertical tubular center section passing through said bottom plate opening and said strainer member central opening, said center section having a head portion closing off the upper portion thereof of greater diameter than the diameter of said strainer member central opening, said center section further having a passageway through a side portion thereof positioned above said bottom plate to permit fluid communication between the interior of said strainer member and the interior of said central section; and
   c. retaining lug means integral with said central section to hold said strainer assembly in position on said bottom plate, said retaining lug means including at least two lug sections cut from a portion of said central section immediately below said bottom plate having a bottom portion integral with said central section and side and upper portions spaced a short distance from said central section so as to permit a small amount of inward movement of said upper portion of said lug section to allow said lug section to pass through said bottom plate opening and to permit gas accumulated in the upper portion of said filter tank outlet side to pass therethrough into said central section.

2. The invention of claim 1 wherein a resiliant washer means is tensioned between said center section head portion and the upper surface of said strainer means.

3. The invention as defined in claim 1 wherein said upper portion having an outside diameter greater then the diameter of said bottom plate opening and a horizontal upper surface associated therewith for contact with the lower surface of said bottom plate.

4. In a filter apparatus of the type providing a serivce cycle, a gas scouring cycle, a backwash cycle, and including a filter tank, a backwash supply means, and means for providing a gas under pressure, said filter tank having an upper inlet side and a lower outlet side with a filter bed supported upon a bottom plate therebetween; the improvement being a strainer assembly comprising:
   a. a strainer member attached to the upper surface of said bottom plate, said strainer member having a plurality of apertures passing through the sidewalls thereof;
   b. a substantially vertical tubular member passing through an aperture in said bottom plate having an upper section positioned within said strainer means and a lower section extending into said filter tank outlet side, said upper section having apertures therethrough such that the interior of said upper section is in fluid communication with the interior of said strainer means, said lower section having an open bottom end and a passageway passing through a portion of said lower section positioned immediately below said bottom plate so as to permit gas accumulated in the upper portion of said filter tank outlet side to pass therethrough into said lower section of said tubular member;
   c. said backwash supply means and said means for providing gas under pressure being in communication with said filter tank outlet side;
   d. said strainer member includes an upper surface having an aperture therethrough;
   e. said upper section of said tubular member having a portion passing through said aperture in said upper surface of said strainer member;
   f. said upper section of said tubular member having a head portion closing off the top thereof of greater diameter than the diameter of said aperture in said upper surface of said strainer member;
   g. retaining lug means integral with the lower section of said tubular member to contact the lower surface of said bottom plate and thereby hold said strainer member in position on said bottom plate;
   h. said retaining lug means includes at least two lug sections cut from said lower section of said tubular member, said lug sections having an upper portion with an outside diameter greater than the diameter of said aperture in said bottom plate;

i. said lug sections having a bottom portion integral with said lower section of said tubular member and side and top portions spaced a short distance from said lower section of said tubular member so as to permit a small amount of inward movement of said top portion of said lug section, and thus allow said lug section to pass through said aperture in said bottom plate; and j. said passageway passing through said lower section permitting gas accumulated in the upper portion of said filter tank outlet side to pass therethrough into said lower section of said tubular member being formed by the spacing between said lower section of said tubular member and said side and top portions of said lug section.

5. The invention of claim 4 wherein a resiliant washer means is tensioned between said upper surface of said strainer member and said head portion.

6. The invention of claim 4 wherein said strainer member means is injection molded of a plastic material.

* * * * *